(12) United States Patent
Nishimoto et al.

(10) Patent No.: US 7,603,250 B2
(45) Date of Patent: Oct. 13, 2009

(54) ABNORMALITY JUDGING APPARATUS

(75) Inventors: Mitsuhiko Nishimoto, Kashihara (JP); Eiki Sugimoto, Okazaki (JP)

(73) Assignee: JTEKT Corporation, Osaka (JP)

( * ) Notice: Subject to any disclaimer, the term of this patent is extended or adjusted under 35 U.S.C. 154(b) by 307 days.

(21) Appl. No.: 11/806,185

(22) Filed: May 30, 2007

(65) Prior Publication Data
US 2007/0291424 A1 Dec. 20, 2007

(30) Foreign Application Priority Data
May 31, 2006 (JP) .............................. 2006-151250

(51) Int. Cl.
*G01C 1/00* (2006.01)
*G06F 19/00* (2006.01)

(52) U.S. Cl. ...................... 702/151; 702/150; 702/189

(58) Field of Classification Search ................. 33/1 R, 33/1 N, 1 PT, 501, 534, 536; 702/1, 127, 702/150, 151, 189
See application file for complete search history.

(56) References Cited

U.S. PATENT DOCUMENTS

| | | | | |
|---|---|---|---|---|
| 6,191,550 | B1 * | 2/2001 | Yoshihara | 318/661 |
| 7,268,988 | B2 * | 9/2007 | Tsutsui | 361/31 |
| 7,298,109 | B2 * | 11/2007 | Sakamaki et al. | 318/489 |
| 2002/0149335 | A1 * | 10/2002 | Imai et al. | 318/494 |
| 2004/0061469 | A1 * | 4/2004 | Imai et al. | 318/494 |
| 2004/0066205 | A1 * | 4/2004 | Imai et al. | 324/709 |
| 2005/0135035 | A1 * | 6/2005 | Tsutsui | 361/93.1 |
| 2006/0273247 | A1 * | 12/2006 | Sakamaki et al. | 250/231.13 |

FOREIGN PATENT DOCUMENTS

| | | |
|---|---|---|
| JP | 11-248487 A | 9/1999 |
| JP | 2001-343253 A | 12/2001 |
| JP | 2001-349748 A | 12/2001 |
| JP | 2002-104212 A | 4/2002 |

* cited by examiner

*Primary Examiner*—Edward R Cosimano
(74) *Attorney, Agent, or Firm*—Birch, Stewart, Kolasch & Birch, LLP

(57) ABSTRACT

An abnormality judging apparatus of a rotation angle detecting apparatus generating a sine wave signal and a cosine wave signal according to the rotation angle of a rotor is provided with an interface which receives the sine wave signal, an interface which receives the cosine wave signal, a signal arithmetic circuit which successively calculates the sum of each square of the received sine wave signal and cosine wave signal, a memory which stores as a threshold value the value of the sum of each square of the sine wave signal and cosine wave signal received from the rotation angle detecting apparatus at a predetermined point in time, and a judging circuit which judges that abnormality has occurred at the rotation angle detecting apparatus when the difference between the value calculated by the signal arithmetic circuit and the value stored in the memory is out of a predetermined range.

6 Claims, 8 Drawing Sheets

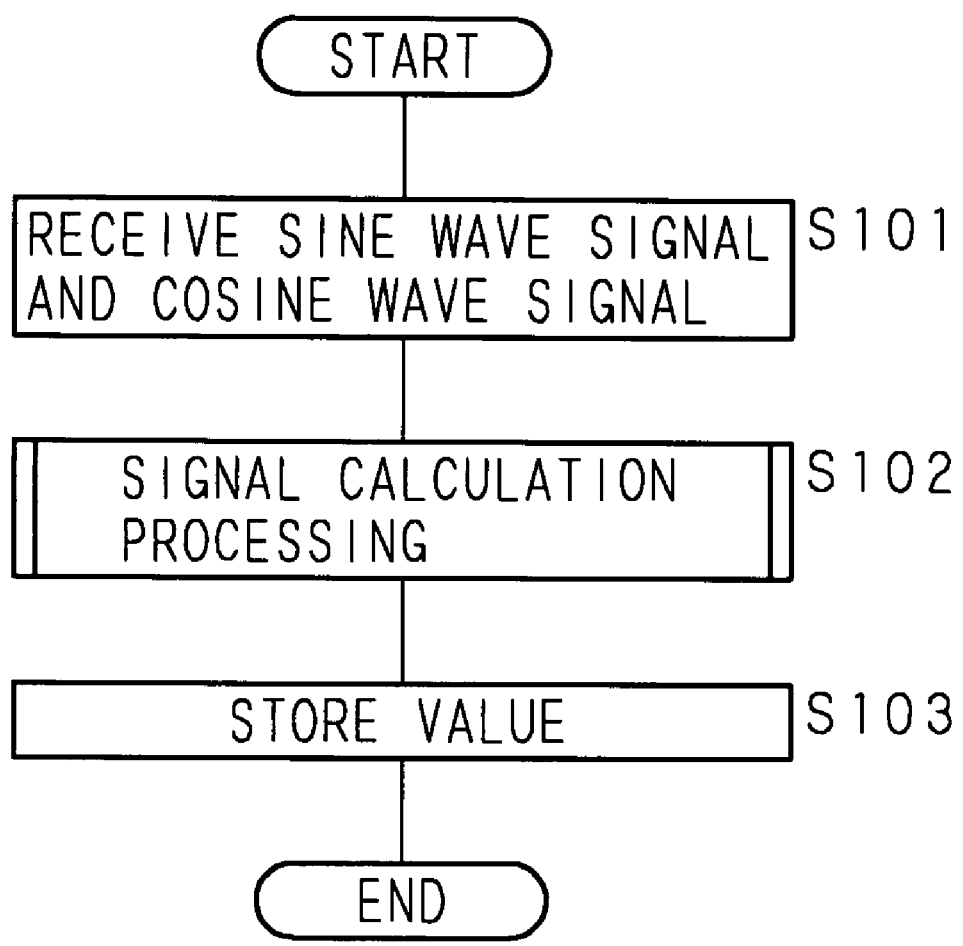
F I G. 4

US 7,603,250 B2

ABNORMALITY JUDGING APPARATUS

CROSS-REFERENCE TO RELATED APPLICATIONS

This Nonprovisional application claims priority under 35 U.S.C. §119(a) on Patent Application No. 2006-151250 filed in Japan on May 31, 2006, the entire contents of which are hereby incorporated by reference.

BACKGROUND

1. Technical Field

The present invention relates to an abnormality judging apparatus which judges whether or not abnormality has occurred at a rotation angle detecting apparatus based on a sine wave signal and a cosine wave signal generated according to the rotation angle of a rotor detected by the rotation angle detecting apparatus.

2. Description of Related Art

In conventional electric power steering (EPS) systems with brushless motors, the rotation angle of the brushless motor is detected by using a resolver, and then the amount of electric current through the brushless motor is controlled based on the detected rotation angle. FIG. 1 is a block diagram of the configuration of a resolver and FIG. 2 is an explanatory drawing of the concept of conventional threshold values for use in abnormality detection.

In FIG. 1, reference numeral 11 denotes a rotor, i.e., a resolver rotor. The resolver rotor 11 has a coil 12 and is attached so as to rotate coaxially with the motor shaft of a brushless motor (not shown). An exciting coil 13, a sine coil 14, and a cosine coil 15 are placed adjacent to the resolver rotor 11. The exciting coil 13 is connected to an AC power supply 16. The sine coil 14 and the cosine coil 15 are connected to a signal processing unit 19 for processing output signals via interfaces 17 and 18 respectively.

When receiving an AC voltage from the AC power supply 16, the exciting coil 13 generates an excitation signal. The sine coil 14 and the cosine coil 15 each output a signal in response to the excitation signal. The outputted signals are transmitted to the signal processing unit 19 as sine wave signal and cosine wave signal, which are same in phase as the excitation coil 13, based on the rotation of the resolver rotor 11. The signal processing unit 19 generates a rotation angle signal, which indicates the rotation angle of the resolver rotor 11, i.e., the rotation angle of the motor shaft of the brushless motor, based on the sine wave signal and cosine wave signal, and outputs the rotation angle signal.

When the rotation angle signal cannot be outputted due to the occurrence of some abnormality such as shorting at the coil or the rotor in the resolver, the control and so on of the brushless motor cannot be normally exercised. Therefore there is a need to reliably detect the abnormality of the resolver.

In view of this, an apparatus has been described (in, for example, Japanese Patent Application Laid-Open No. 2002-104212) in which, for example, a general threshold value given by the relation $\cos^2\theta+\sin^2\theta=1$ is preset, the difference between the threshold value and a detected value obtained by the sum $(\cos^2\theta+\sin^2\theta)$ of each square of a sine wave signal and a cosine wave signal outputted from a resolver is obtained, and it is judged that abnormality has occurred at the resolver when the difference is beyond a predetermined range.

SUMMARY

However, in the apparatus described in Japanese Patent Application Laid-Open No. 2002-104212, there are individual differences among the resolvers, and therefore output signals vary. Because of this, there have been problems that there is a need to broadly set a range of between the upper threshold value and lower threshold value in general as shown in FIG. 2 and it is impossible to reliably detect even abnormalities such as shorting at the layers of a coil that variations in output are minor.

Moreover, although it can also be considered that no individual differences are made by making high-precision resolvers in order to solve the above problems, there has been a problem that the production cost of the resolvers rise considerably.

In view of such circumstances, it is an object to provide an abnormality judging apparatus capable of not only judging whether or not abnormality has occurred at the resolver, i.e., the rotation angle detecting apparatus (an object to be judged) based on a threshold value calculated in consideration of the individual difference of the resolver but also reliably detecting an abnormality that variations in the output of the resolver are minor by storing as the threshold value the value of the sum of each square of a sine wave signal and a cosine wave signal received from the resolver at a predetermined point in time and by judging whether or not abnormality has occurred at the resolver based on the threshold value.

It is another object to provide an abnormality judging apparatus capable of adjusting a threshold value so as to also reliably detect an abnormality that variations in the output of the resolver are minor, by accepting a predetermined range for the difference between a threshold value and a value calculated based on a value received from a resolver for use in judging whether or not abnormality has occurred.

In order to solve the above problems, an abnormality judging apparatus according to a first aspect is an abnormality judging apparatus of a rotation angle detecting apparatus which generates a sine wave signal and a cosine wave signal according to a rotation angle of a rotor, comprising: means for receiving the sine wave signal and cosine wave signal; calculating means for successively calculating the sum of each square of the received sine wave signal and cosine wave signal; storing means for storing the value of the sum calculated by the calculating means at a predetermined point in time; and means for judging that abnormality has occurred at the rotation angle detecting apparatus when the difference between the value of the sum calculated by the calculating means and the value stored in the storing means is out of a predetermined range.

An abnormality judging apparatus according to a second aspect is characterized by further comprising means for accepting the predetermined range.

In the abnormality judging apparatus according to the first and second aspects, the value of the sum of each square of the sine wave signal and cosine wave signal received from the resolver, i.e., the rotation angle detecting apparatus (an apparatus to be judged) at the predetermined point in time is stored as the threshold value, and it is judged whether or not abnormality has occurred at the resolver based on the threshold value.

According to the abnormality judging apparatus according to the first and second aspects, since it is judged whether or not abnormality has occurred at the individual resolvers based on the individual threshold values obtained in consideration of individual differences among the resolvers, there is no need to broaden the ranges of the threshold values in general, even abnormalities that variations in the outputs of the resolvers are minor can be reliably detected without overlooking them. Therefore there is no need to produce a high-precision resolver and a substantial rise in their production cost can be suppressed.

The above and further objects and features will more fully be apparent from the following detailed description with accompanying drawings.

BRIEF DESCRIPTION OF THE SEVERAL VIEWS OF THE DRAWINGS

FIG. 4 is a flowchart of a procedure of storage processing by the abnormality judging apparatus;

DETAILED DESCRIPTION

Figure 1:
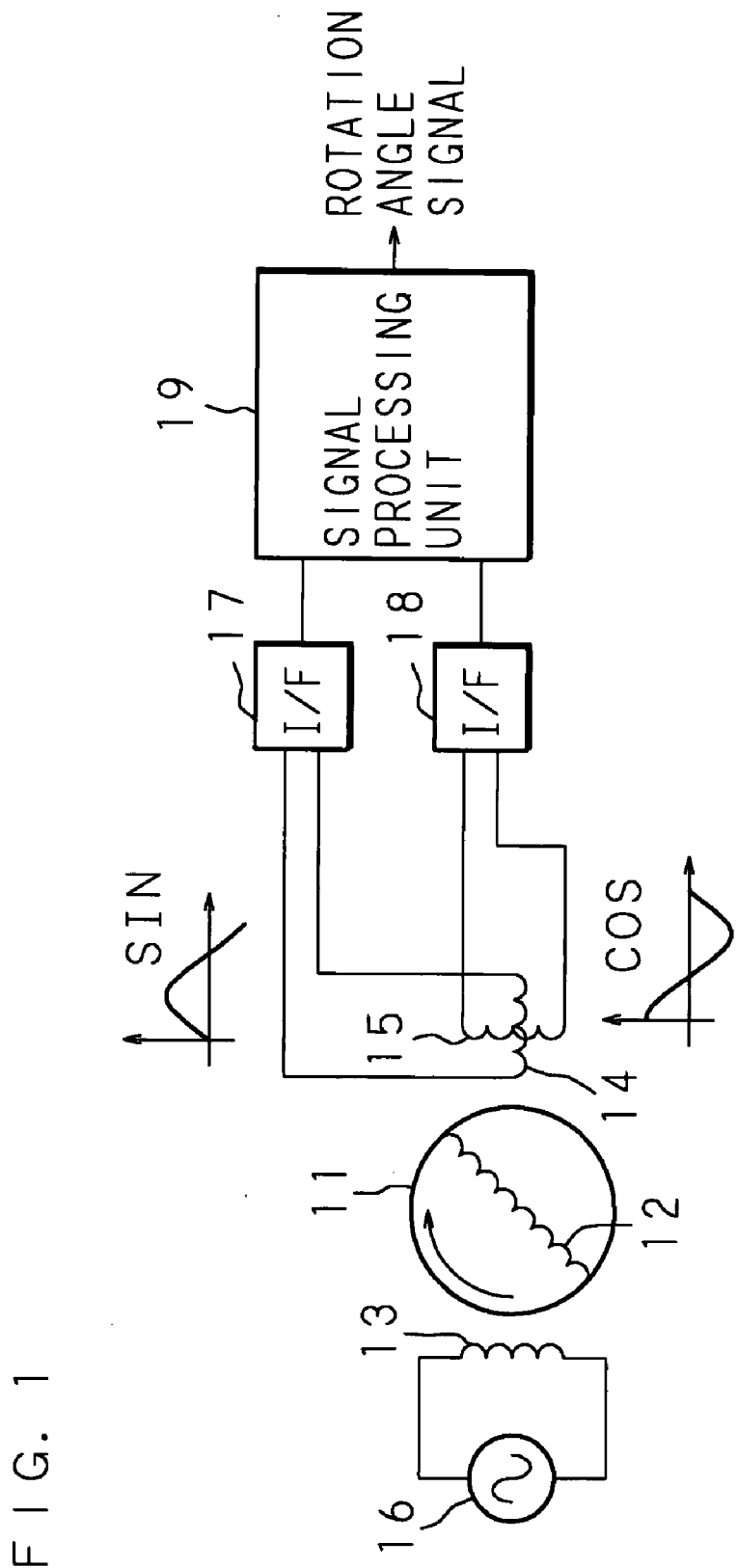
FIG. 1 is a block diagram of the configuration of a resolver.
Figure 2:
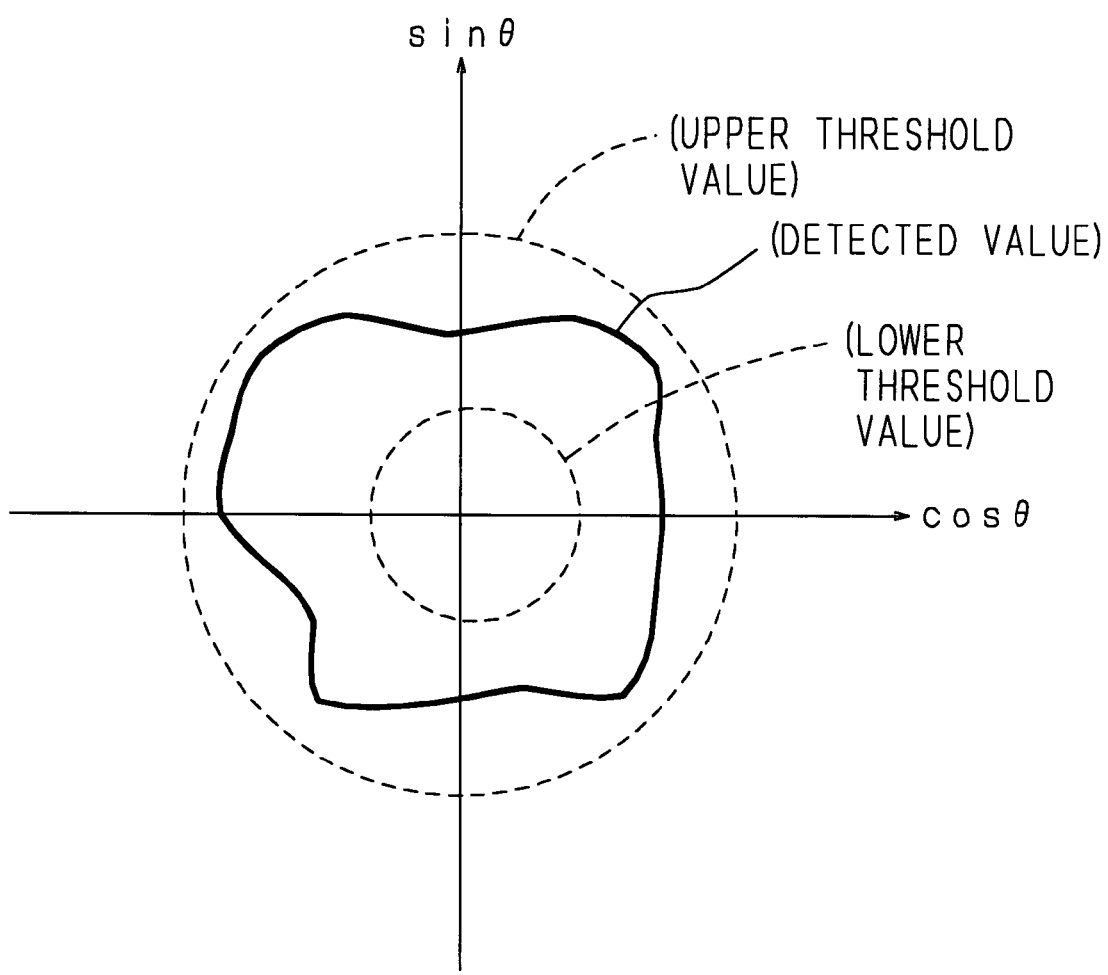
FIG. 2 is an explanatory drawing of the concept of conventional threshold values for use in abnormality detection.
Figure 3:
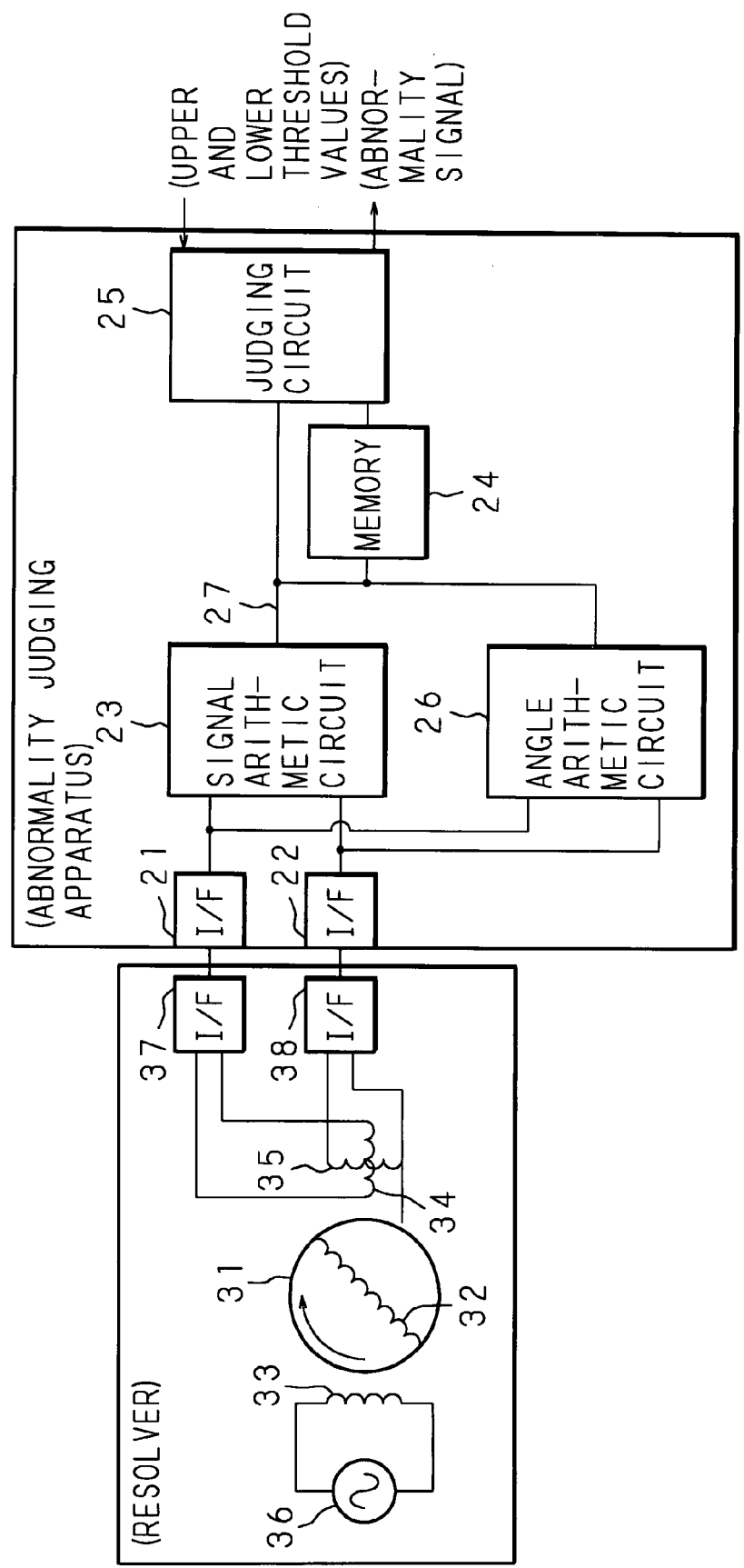
FIG. 3 is a block diagram of the configuration of an abnormality judging apparatus.

The present embodiment will now be described below with reference to the drawings. FIG. 3 is a block diagram of the configuration of an abnormality judging apparatus. In FIG. 3, reference numerals 21 and 22 denote interfaces (receiving units) which receive a sine wave signal sent from an interface 37 of a resolver and a cosine wave signal sent from an interface 38 of the resolver. The abnormality judging apparatus comprises a signal arithmetic circuit (calculating unit) 23 which calculates successively the sum of each square of the sine wave signal and cosine wave signal received from the interfaces 21 and 22 respectively, a memory (storing unit) 24 which stores the value of the sum of each square calculated by the signal arithmetic circuit 23 at a predetermined point in time as a threshold value, a judging circuit (judging unit) 25 which judges whether or not the difference between the value calculated successively by the signal arithmetic circuit 23 and the value stored in the memory 24 are in a predetermined range and which outputs a signal indicating an abnormality of the resolver according to the judgment, an angle arithmetic circuit 26 which calculates a rotation angle θ based on the sine wave signal and cosine wave signal received from the interfaces 21 and 22 and which sends the calculated rotation angle θ to the memory 24. These components are coupled one after the other via connecting wires 27. Note that a resolver rotor 31, a coil (generator) 32, an exciting coil (generator) 33, a sine coil (generator) 34, a cosine coil (generator) 35, an AC power supply 36, and interfaces 37 and 38 constituting the resolver of FIG. 3 are the same as those of FIG. 1, and therefore their detailed description will be omitted.

Next, a procedure by which the abnormality judging apparatus feeds the threshold value into the memory 24 will be described below. FIG. 4 is a flowchart of a procedure of storage processing by the abnormality judging apparatus, First, the resolver rotor 31 is rotated one rotation at a rotational speed R obtained by the expression R≦A/(1/T)=AT [deg/s] (where T is a receiving rate [times/s] for sine wave signal and cosine wave signal and A is a required angular resolution [deg] for sine wave signal and cosine wave signal) at a point in time when the resolver as an object to be judged is operating normally, and then a sine wave signal generated by the sine coil 34 and a cosine wave signal generated by the cosine coil 35 according to the rotation are outputted through the interfaces 37 and 38 to the abnormality judging apparatus. In this case, the phrase "a point in time when the resolver is operating normally" refers to, for example, a point in time when the resolver has not deteriorated with time, a point in time the resolver has been produced, or a point in time when the resolver has been attached to an EPS system.

The abnormality judging apparatus receives the sine wave signal and cosine wave signal outputted from the resolver via the interfaces 21 and 22 (S101), subjects the received sine wave signal and cosine wave signal to the signal calculation processing set forth below (S102), and stores the value of the signals subjected to the signal calculation processing in the memory 24 as the threshold value (S103).

Figure 5:
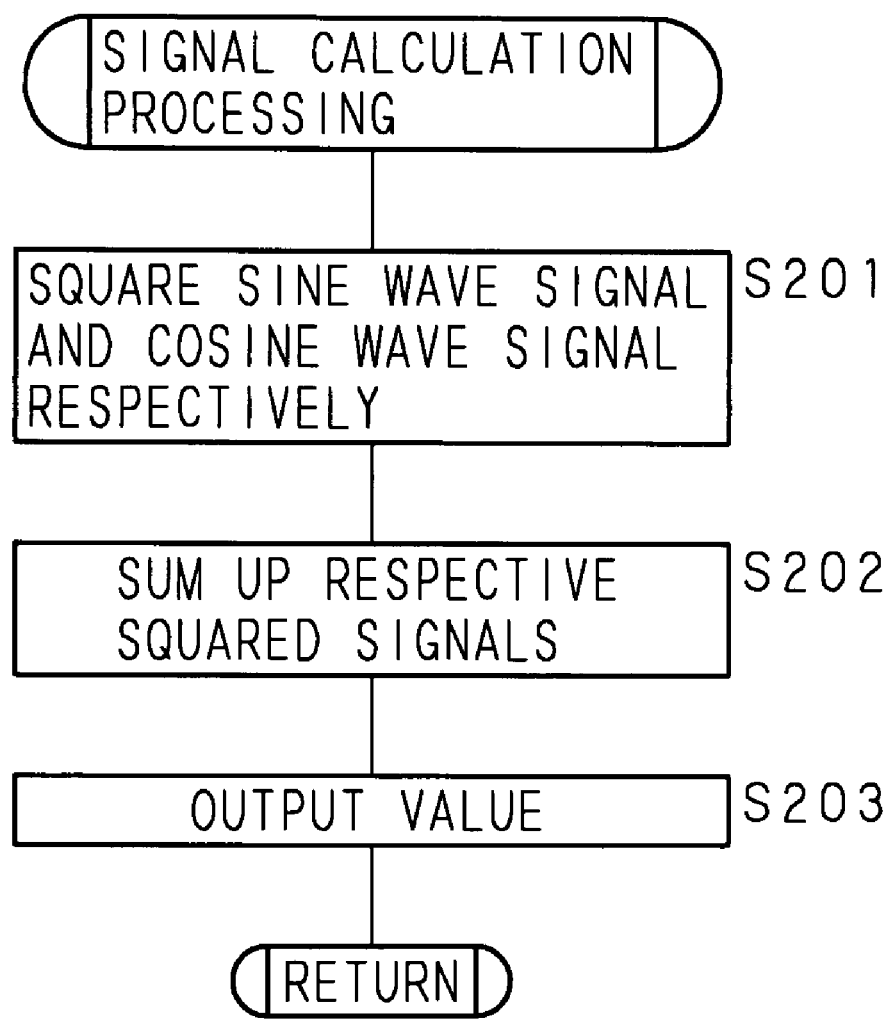
FIG. 5 is a flowchart of a procedure of signal calculation processing by the abnormality judging apparatus.

In the signal calculation processing, as shown in FIG. 5, the signal arithmetic circuit 23 of the abnormality judging apparatus squares the values of the sine wave signal sin θ and the cosine wave signal cos θ received from the interfaces 37 and 38 of the resolver respectively (S201), sums up the squared signal values (S202), and outputs the resulting signal value to the memory 24 and so on (S203).

Figure 6:
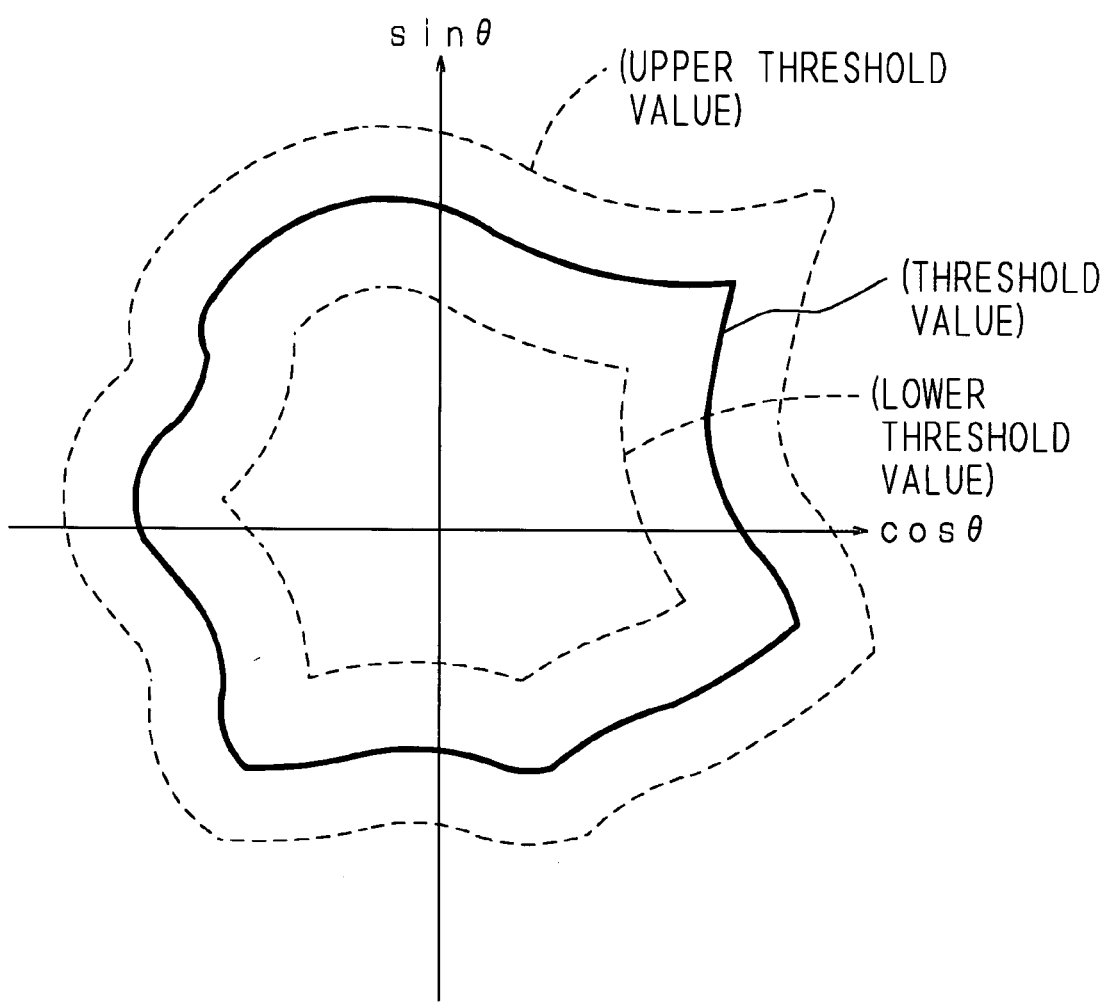
FIG. 6 is an explanatory drawing of the concept of threshold values.

The signal value thus outputted, which does not exhibit a general circular Lissajou's waveform but a waveform deformed according to an individual difference inherent in the resolver as shown in FIG. 6, is stored in the memory 24 as a threshold value. Therefore both of an upper threshold value and a lower threshold value also exhibit waveforms deformed according to the individual difference inherent in the resolver. An area ranging from the upper threshold value to the lower threshold value shows a predetermined range.

Furthermore, the memory 24 not only stores the threshold values as waveforms but can store only a value of (cos θ, sin θ), (cos θ, sin θ, θ), ($cos^2$θ, $sin^2$θ, θ), ($cos^2$θ+$sin^2$θ, cos θ), ($cos^2$θ+$sin^2$θ, sin θ), (cos θ, θ), or (sin θ, θ) to calculate threshold values successively from such a value based on the theorem.

Figure 7:
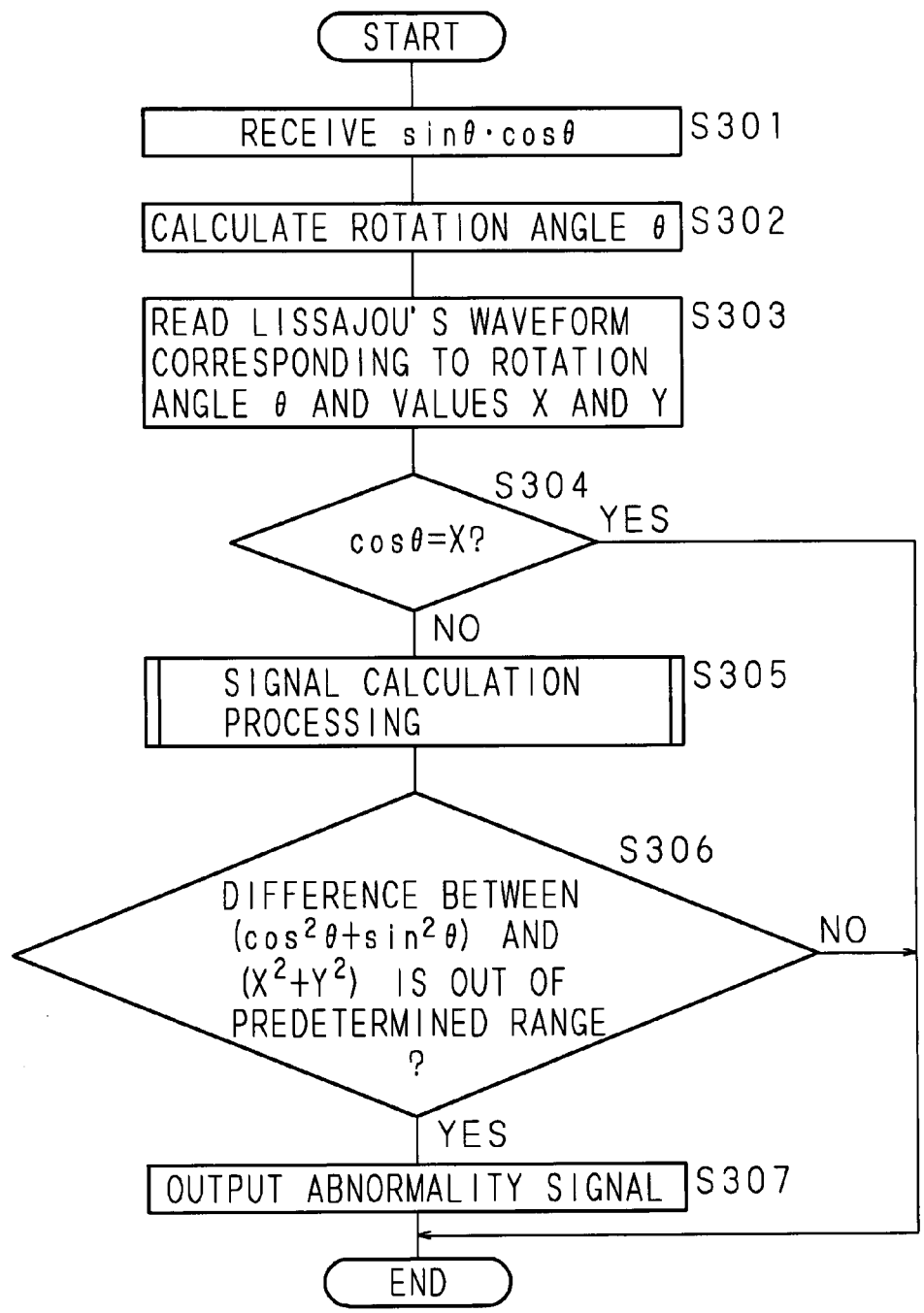
FIG. 7 is a flowchart of a procedure of judgment processing by the abnormality judging apparatus.
Figure 8:
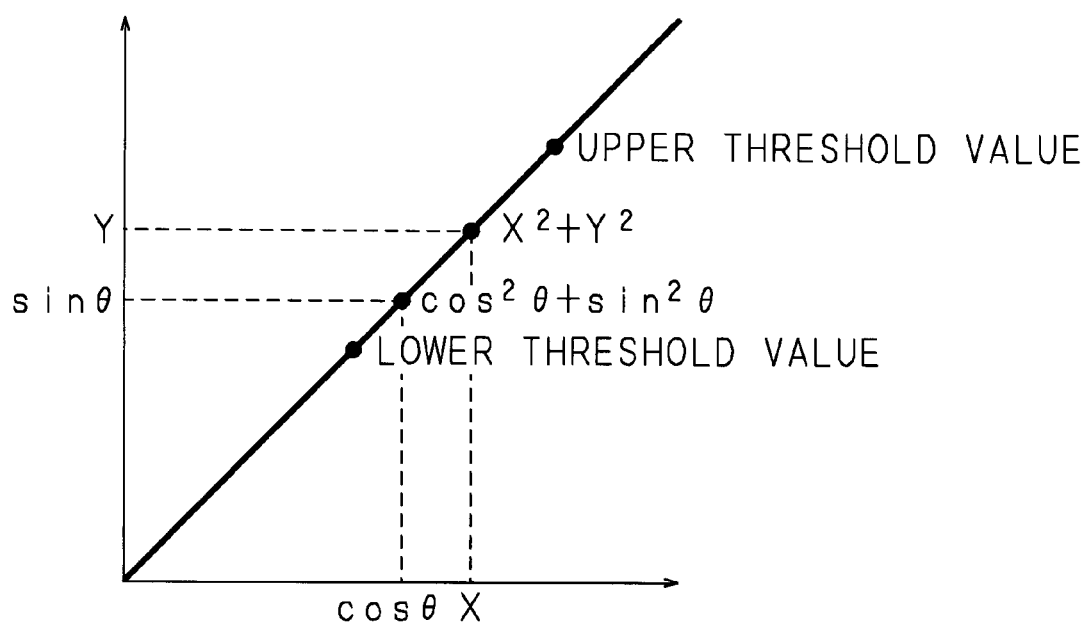
FIG. 8 is an explanatory drawing of the concept of a predetermined range.

Then a procedure of judgment processing in which the abnormality judging apparatus judges whether abnormality has occurred at the resolver will be described below. FIG. 7 is a flowchart of the procedure of the judgment processing by the abnormality judging apparatus and FIG. 8 is an explanatory drawing of the concept of a predetermined range of between the threshold values.

In the judgment processing by the abnormality judging apparatus, the angle arithmetic circuit 26 receives the sine wave signal sin θ outputted from the interface 37 of the resolver and the cosine wave signal cos θ outputted from the interface 38 (S301), calculates a rotation angle θ from the received sine wave signal sin θ and cosine wave signal cos θ based on the expression θ=$tan^{-1}$×(sin θ/cos θ) (S302), and sends the calculated rotation angle θ to the memory 24. A waveform corresponding to the received rotation angle θ and values X and Y on the waveform are read from the memory 24 (S303), and then the waveform and values X and Y read therefrom are sent to the judging circuit 25. The judging circuit 25 judges whether or not the cosine wave signal cos θ received from the interface 38 and the value X received from the memory 24 are equal (S304). When it has been judged that they are equal (YES in S304), the processing is finished without outputting an abnormality signal. In contrast, when it has been judged at the judging circuit 25 that they are not equal (NO in S304), the signal arithmetic circuit 23 performs signal calculation processing (S305), and the judging circuit 25 judges whether or not the difference between the sum of each square of the sine wave signal and cosine wave signal calculated through the signal calculation processing ($\cos^2\theta + \sin^2\theta$) and the waveform read from the memory 24 ($X^2+Y^2$) is out of the predetermined range (S306). Note that, as shown in FIG. 8, such judgment is made so as to judge whether or not the sum of each square of the two signals calculated through the signal calculation processing ($\cos^2\theta+\sin^2\theta$) is out of the range defined by the upper and lower threshold values on both sides of the waveform ($X^2+Y^2$).

As a result, when it has been judged that the sum is out of the predetermined range (YES in S306), the judging circuit 25 outputs an abnormality signal (S307); when it has been judged that the sum is in the predetermined range (NO in S306), the processing is finished without outputting an abnormality signal. Note that, at S304, the judging circuit 25 may judge whether or not the sine wave signal sin θ received from the interface 37 and the value Y received from the memory 24 are equal.

Then another apparatus (not shown) having received the abnormality signal from the judging circuit 25 executes predetermined fail processing to deal with an abnormality of the resolver.

Moreover, the upper and lower threshold values on both sides of the waveform ($X^2+Y^2$) shown in FIG. 8 can be arbitrarily set by feeding values from the outside to the judging circuit 25. In other words, the judging circuit 25 accepts the predetermined range. As a consequence, an adjustment can be made so as to reliably detect an abnormality that variations in the output of the resolver are minor.

Furthermore, in the judgment processing by the abnormality judging apparatus described in the above embodiment, the rotation angle θ is calculated from the received sine wave signal sin θ and the received cosine wave signal cos θ by the expression $\theta = \tan^{-1} \times (\sin\theta/\cos\theta)$, whereas this is not limiting; cross reference may be stored in advance in the memory 24 to suitably calculate the rotation angle θ by utilizing the cross reference.

As this description may be embodied in several forms without departing from the spirit of essential characteristics thereof, the present embodiment is therefore illustrative and not restrictive, since the scope is defined by the appended claims rather than by the description preceding them, and all changes that fall within metes and bounds of the claims, or equivalence of such metes and bounds thereof are therefore intended to be embraced by the claims.

What is claimed is:

1. An abnormality judging apparatus of a rotation angle detecting apparatus which generates a sine wave signal and a cosine wave signal according to a rotation angle of a rotor, comprising:
    a receiving unit for receiving the sine wave signal and cosine wave signal;
    a calculating unit for successively calculating the sum of each square of the sine wave signal and cosine wave signal received from the receiving unit;
    a storing unit for storing the value of the sum calculated by the calculating unit at a predetermined point in time; and
    a judging unit for judging that abnormality has occurred at the rotation angle detecting apparatus when the difference between the value of the sum calculated by the calculating unit and the value stored in the storing unit is out of a predetermined range.

2. The abnormality judging apparatus according to claim 1, wherein the judging unit accepts the predetermined range.

3. The abnormality judging apparatus according to claim 1, wherein the rotation angle detecting apparatus includes a generator for generating the sine wave signal and cosine wave signal according to the rotation angle of the rotor.

4. An abnormality judging apparatus of a rotation angle detecting apparatus which generates a sine wave signal and a cosine wave signal according to a rotation angle of a rotor, comprising:
    means for receiving the sine wave signal and cosine wave signal;
    calculating means for successively calculating the sum of each square of the received sine wave signal and cosine wave signal;
    storing means for storing the value of the sum calculated by the calculating means at a predetermined point in time; and
    means for judging that abnormality has occurred at the rotation angle detecting apparatus when the difference between the value of the sum calculated by the calculating means and the value stored in the storing means is out of a predetermined range.

5. The abnormality judging apparatus according to claim 4, further comprising means for accepting the predetermined range.

6. The abnormality judging apparatus according to claim 4, wherein the rotation angle detecting apparatus includes generating means for generating the sine wave signal and cosine wave signal according to the rotation angle of the rotor.

* * * * *